US00RE36848E

United States Patent [19]

Bui et al.

[11] E Patent Number: Re. 36,848

[45] **Reissued Date of Patent: *Sep. 5, 2000**

[54] AIR PERCUSSION DRILLING ASSEMBLY

[75] Inventors: Huy D. Bui, Houston, Tex.; Michael S. Oliver, Lafayette, La.

[73] Assignee: Smith International, Inc., Houston, Tex.

[ * ] Notice: This patent is subject to a terminal disclaimer.

[21] Appl. No.: 08/665,801

[22] Filed: Jun. 18, 1996

Related U.S. Patent Documents

Reissue of:

[64] Patent No.: 5,322,136
Issued: Jun. 21, 1994
Appl. No.: 07/916,285
Filed: Jul. 17, 1992

[51] Int. Cl.[7] ..... E21B 4/14

[52] U.S. Cl. ..... 175/65; 173/110; 173/111; 175/106; 175/296

[58] Field of Search ..... 175/296, 92, 106, 175/93, 65, 101, 305; 173/110, 111, 78, 73, 94, 95, 96, 97

[56] References Cited

U.S. PATENT DOCUMENTS

| | | | |
|---|---|---|---|
| Re. 33,751 | 11/1991 | Geczy et al. | 175/61 |
| 1,773,366 | 8/1930 | Lear . | |
| 2,597,574 | 5/1952 | Dickenson | 173/97 |
| 2,755,069 | 7/1956 | Mosby | 255/38 |
| 3,139,035 | 6/1964 | O'Connor | 103/117 |
| 3,166,131 | 1/1965 | Worman | 173/105 |
| 3,171,501 | 3/1965 | Lear | 173/96 |
| 3,323,601 | 6/1967 | Uebel | 173/76 |
| 3,404,739 | 10/1968 | Worman | 173/96 |
| 3,405,771 | 10/1968 | Carr et al. | 175/73 |
| 3,741,316 | 6/1973 | Alajournine | 173/107 |
| 3,871,193 | 3/1975 | Young | 175/321 X |
| 3,899,033 | 8/1975 | Van Huisen | 175/97 |
| 3,912,023 | 10/1975 | Amtsberg | 173/131 |
| 3,946,819 | 3/1976 | Hipp | 175/296 |
| 3,978,931 | 9/1976 | Sudnishnikov et al. | 175/99 |
| 4,209,070 | 6/1980 | Sudnishnikov et al. | 173/78 |
| 4,211,521 | 7/1980 | Streicher | 418/48 |
| 4,243,109 | 1/1981 | Anderson | 173/93.5 |
| 4,346,767 | 8/1982 | Vaughan | 173/109 |
| 4,427,079 | 1/1984 | Walter | 175/106 |
| 4,462,471 | 7/1984 | Hipp | 175/296 |
| 4,705,118 | 11/1987 | Ennis | 175/65 |
| 4,721,172 | 1/1988 | Brett et al. | 175/26 |
| 4,785,898 | 11/1988 | Kostylev et al. | 175/19 |
| 4,819,739 | 4/1989 | Fuller | 173/17 |
| 4,852,669 | 8/1989 | Walker | 175/73 |
| 4,858,701 | 8/1989 | Weyer | 173/50 |
| 4,880,065 | 11/1989 | McDonald et al. | 175/71 |
| 4,924,948 | 5/1990 | Chuang | 173/139 |
| 4,932,483 | 6/1990 | Rear | 175/296 |
| 4,958,691 | 9/1990 | Hipp | 175/296 |
| 5,094,303 | 3/1992 | Jenne | 173/91 |
| 5,139,093 | 8/1992 | Lyon et al. | 173/97 |
| 5,156,223 | 10/1992 | Hipp | 175/296 |
| 5,305,837 | 4/1994 | Johns et al. | 175/61 |

FOREIGN PATENT DOCUMENTS

| | | | |
|---|---|---|---|
| 1689605 | 11/1991 | U.S.S.R. | 175/296 |
| 170009 | 10/1922 | United Kingdom | 173/97 |

OTHER PUBLICATIONS

Sonoma Corporation Hipp–Tripper™ Vibratory Impact Drill Brochure.

*Primary Examiner*—Hoang Dang
*Attorney, Agent, or Firm*—Conley, Rose & Tayon

[57] ABSTRACT

An air percussion hammer drill is disclosed for operation in an earthen formation. The air compression hammer mechanism comprises a piston that reciprocates while simultaneously rotating within its housing. A hammer drill bit slidably keyed to the bottom of the piston transfers the impact energy to the formation and rotates during operation independent of an attached drill string.

18 Claims, 4 Drawing Sheets

*Figure 3*
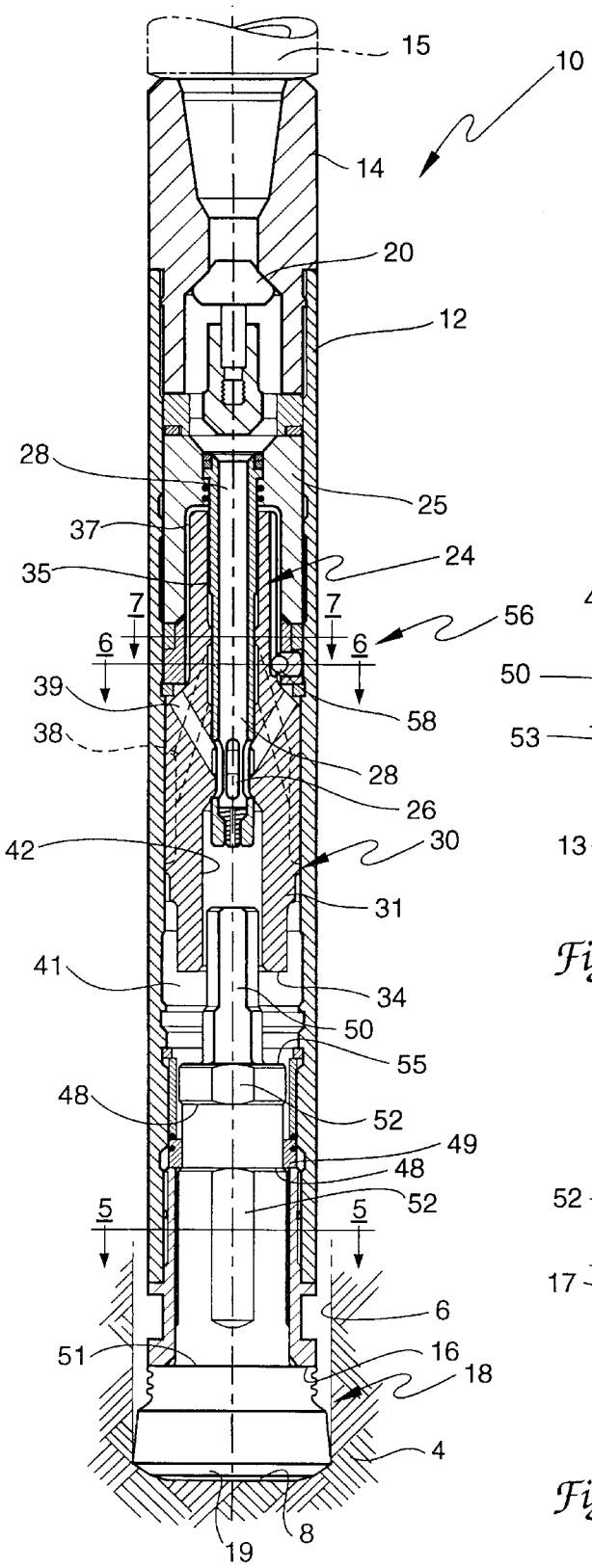
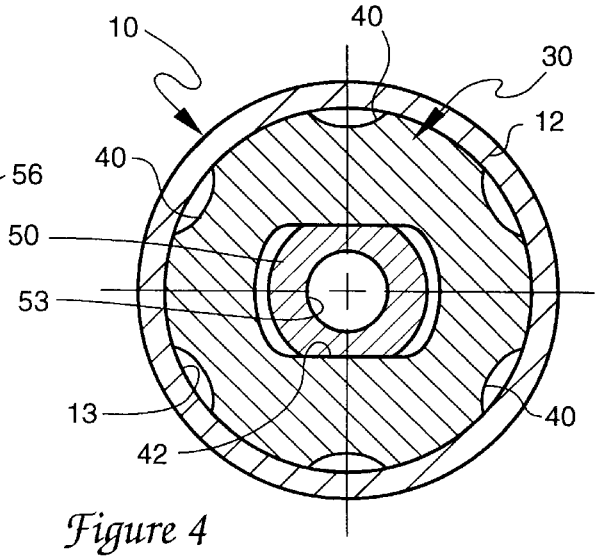
*Figure 4*
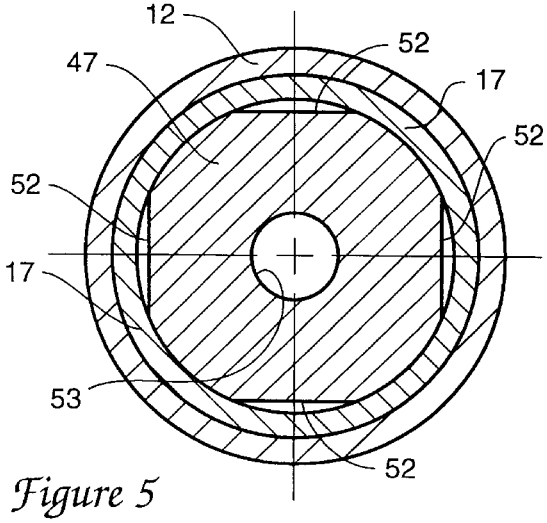
*Figure 5*

*Figure 8*
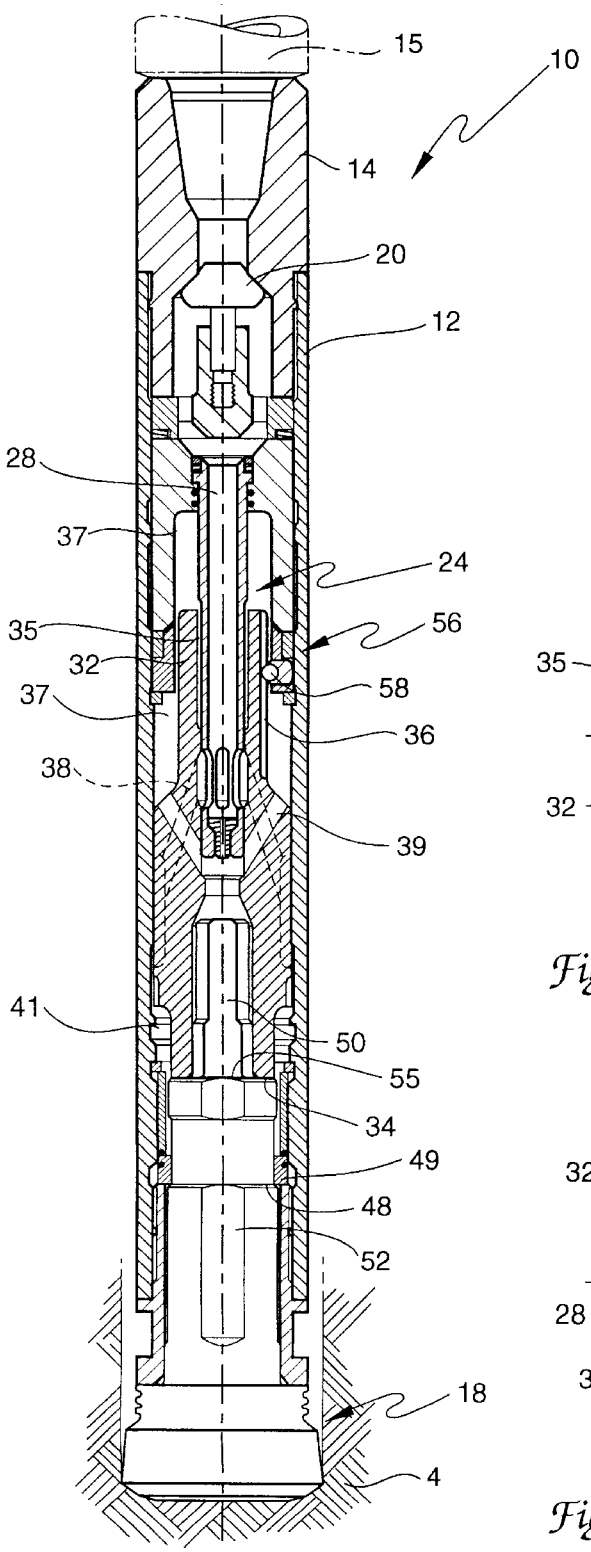
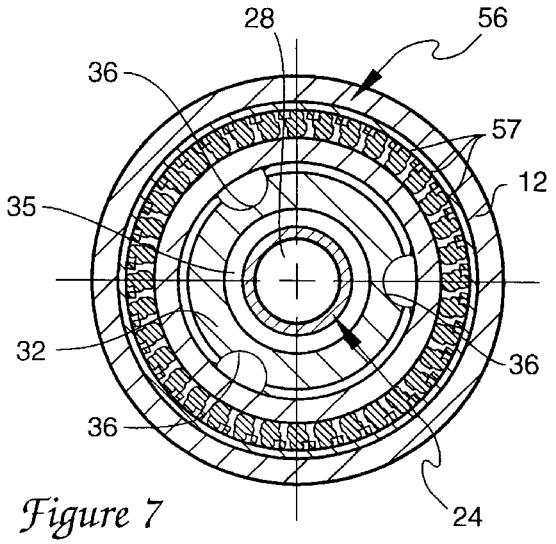
*Figure 7*
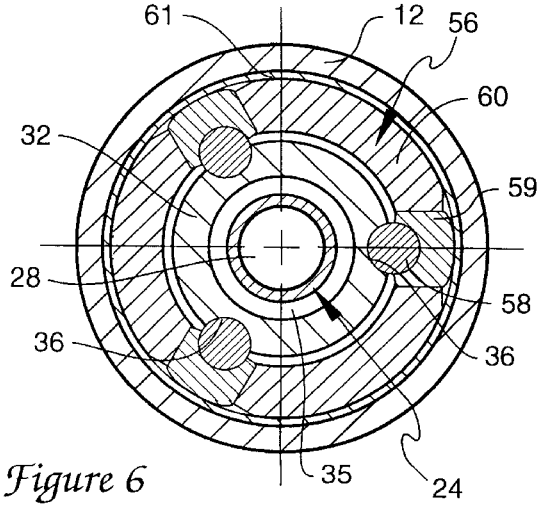
*Figure 6*

AIR PERCUSSION DRILLING ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an air compression hammer drill tool. More particularly, this invention relates to a downhole air compression hammer that impacts while simultaneously rotates the bit, thereby assuring maximum penetration of the bit in an earthen formation independent of the rotation of the drill string.

2. Description of the Prior Art

In percussion drilling the rock cutting mechanism is of an impacting nature rather than shearing. Therefore, the drill bit rotational parameters, e.g. torque and rpm, are not relevant from a rock formation breaking point of view, except for the necessity that the cutting elements of the bit need to be "indexed" to fresh rock formations. In straight hole air drilling, and especially in mining, this need is achieved by rotating the drill string slowly. This is accomplished in conventional hammer bit operations by incorporated longitudinal splines which key the bit body to a cylindrical sleeve at the bottom of the hammer (commonly known as the sub driver). The drill string rotation is then transferred to the hammer bit itself. Experience has proven that the bit optimum rotational speed is approximately 20 rpm for an impact frequency of 1600 bpm (beats per minute). This rotational speed translates to an angular displacement of approximately 4 to 5 degrees per impact of the bit against the rock formation. Another way to express this rotation is the cutters positioned on the outer row of the hammer bit move at the rate of one half the cutter diameter per stroke of the hammer.

An example of a typical hammer bit connected to a rotatable drill string is described in U.S. Pat. No. 4,932,483. The downhole hammer comprises a top sub and a drill bit separated by a tubular housing incorporating a piston chamber therebetween. A feed tube is mounted to the top sub and extends housing and over the feed tube. Fluid porting is provided in the feed tube and the piston to sequentially admit fluid in a first space between the piston and top sub to drive the piston towards the drill bit support and to a second space between the piston and the drill bit support to drive the piston towards the top sub.

Rotary motion is provided to the hammer assembly and drill bit by the attached drill string powered by a rotary table typically mounted on the rig platform.

SUMMARY OF THE INVENTION

It is an object of this invention to provide a hammer assembly that reciprocates and simultaneously rotates a hammer bit.

It is another object of this invention to provide an air percussion drilling assembly wherein the hammer mechanism converts axial motion of the reciprocating piston to rotary motion of an extended portion of the bit body as the bit works in a borehole.

The kinetic energy of the reciprocating piston is employed to rotate the bit. The linear motion of the piston is converted into rotational motion by using one or more helical grooves formed by the piston body. To prevent the piston from oscillating in the rotary mode, an indexing clutch mechanism is provided to induce bit rotation in one direction only.

The upper portion of the hammer bit (normally splined) is replaced by a shaft that is slidably engaged with and keyed to a complimentarily shaped female receptacle or bore formed by the lower portion of a piston. The shaft of the hammer is therefore, slidably engaged at all times, to the base of the piston and is so designed to be rotated by the indexing piston with a minimum of drag. Thus, axial motion between the piston and bit body is allowed but relative rotational motion is not, i.e. the bit would rotate if the piston rotate and vice versa. One or more longitudinal helical grooves are machined on the piston upper section. These grooves are keyed to an inner race of a "sprag" clutch assembly via dowel pins or spherical balls. The outer race of this clutch assembly is locked to the inner bore of a cylindrical hammer housing. The clutch sprags are set to clockwise motion and to prevent counter clockwise rotational movement of the inner race with respect to the outer race.

The downward motion of the piston, (the piston being coupled to the clutch through interaction between the helical groove, the engaged ball and the clutch) mandates either a counter clockwise rotation of the inner race or a clockwise rotation of the piston. Since counter clockwise rotation of the inner race is not possible, the piston must rotate clockwise when the piston moves downward. Similarly, the upward motion of the piston requires either the clockwise rotation of the inner race or the counter clockwise rotation of the piston. Since the friction against the clockwise rotation of the inner race is significantly less than that against the piston/bit rotation, the inner race would rotate clockwise and allows the piston to move straight upward. Therefore, on the downstroke of the piston the bit is forced to rotate clockwise; while on the upstroke the inner race rotates instead, thereby preventing the bit from "turning back".

An air percussion hammer apparatus with means for rotating the hammer bit while its piston reciprocates in a housing independent of an attached drill string is disclosed. The bit rotating means consists of a cylindrical housing forming a first open up-stream end connectable to a drill string component and a second downstream end, the second end containing the hammer bit.

A pneumatic feed tube forms a first open end and a second substantially closed end, the first end of the feed tube being concentric with and fixed within the housing. The feed tube is positioned toward the first up-stream end of the housing, the second end of the feed tube forms one or more metered openings between the first and second ends of the feed tube.

A piston body is slidably retained within a first sleeve formed by the housing. The piston body forms first and second open ends with the first end being concentrically retained and slidably engaged with the second end of the feed tube. The second downstream end of the piston forms a hammer striking surface. The piston further forms at least one axially oriented helical groove in an outside wall of the first upstream end of the piston and a pair of pneumatic communication ports between an outside wall of the body and an interior chamber formed by the body. More specifically, one of the ports leads from an interior chamber formed by the piston toward the second end of the piston to a chamber formed between the first open end of the piston and the cylindrical housing. The other of the ports leads from an interior chamber formed between an exterior wall of the piston and the sleeve formed by the housing toward the second open end of the piston. One or the other of the ports in the body sequentially registers with the metered openings in the feed tube when the reciprocating piston is moved into alignment therewith during an operating cycle of the apparatus. The second end of the piston body further forms a longitudinal sleeve therein.

A hammer bit body is slidably contained within a cylindrical sleeve formed by the second end of the cylindrical housing. The bit body forms a first upstream shaft end adapted to slidably engage the sleeve or bore formed in the bottom portion of the piston. Means are formed between the shaft of the bit and the bore of the piston to slideably key the shaft to the piston so that the bit rotates with the piston. The hammer bit body further forms a second, bit cutter end.

A clutch means is contained within the housing and is positioned adjacent to and interconnected with the helical groove formed in the first end of the piston. The clutch mean serves to rotate the piston and the bit keyed thereto, incrementally and in one direction only, each time the piston reciprocates within the cylindrical housing during operation of the air percussion apparatus.

An advantage then of the present invention over the prior art hammer tools is the ability to rotate the bit independent of any rotation of the drillstring.

The above noted objects and advantages of the present invention will be more fully understood upon a study of the following description in conjunction with the detailed drawings.

BRIEF DESCRIPTION OF THE DRAWINGS

FIG. 3 is a cross-sectional view of the hammer mechanism with the bit cutter end contacting the formation, the piston being at the top of its stroke;

FIG. 4 is a section taken through 4—4 of FIG. 1 illustrating the inner and outer air passages formed by the hammer bit body;

FIG. 5 is a section taken through 5—5 of FIG. 3 showing the relationship formed between the hammer housing and the shank of the hammer bit;

FIG. 6 is a section taken through 6—6 of FIG. 3 illustrating the clutch mechanism including the helical groove and ball engaging system that results in bit rotary motion converted from piston reciprocating motion;

FIG. 7 is a section taken through 7—7 of FIG. 3 illustrating the sprags housed within the clutch that prevent the piston from oscillating; the clutch mechanism insures that the piston always rotates in a clockwise direction.

FIG. 8 is a cross-sectional view of the percussion mechanism at the termination of one complete cycle;

DESCRIPTION OF THE PREFERRED EMBODIMENTS AND BEST MODE FOR CARRYING OUT THE INVENTION

Figure 1:
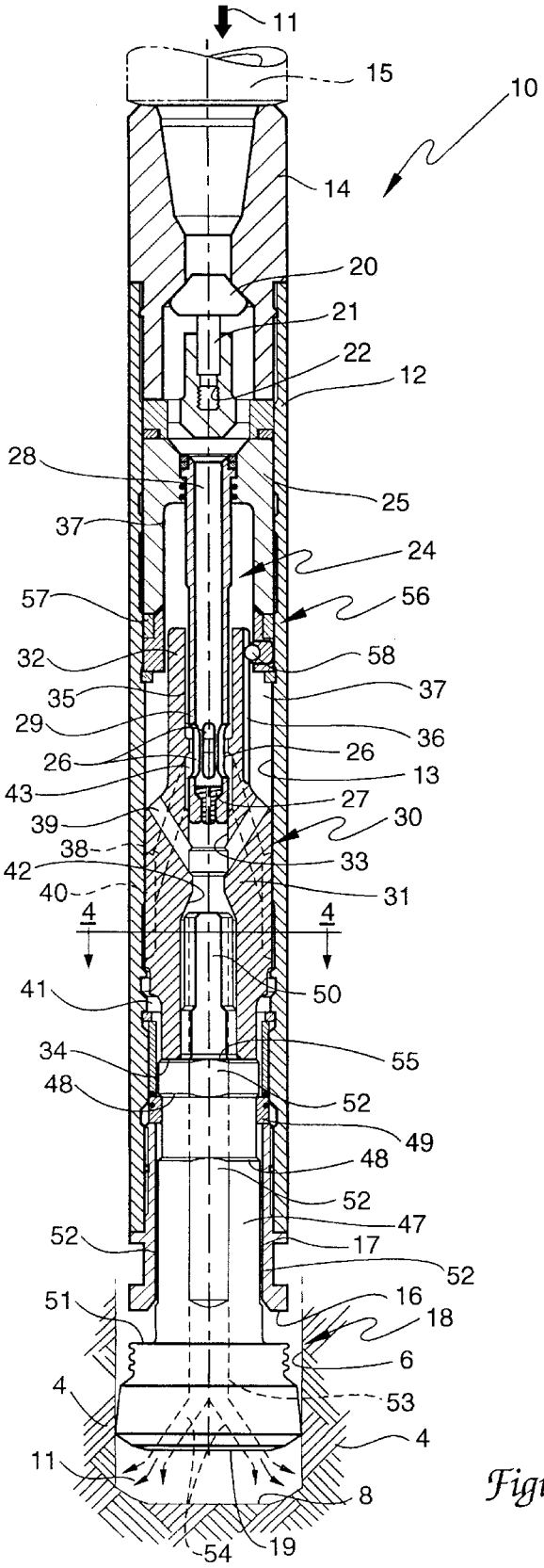
FIG. 1 is a cross-sectional view of the hammer mechanism and bit connected to a drill string.

FIG. 1 illustrates an air percussion drilling assembly generally designated as 10. The air percussion apparatus consists of a cylindrical housing 12 that forms an up-stream threaded female end 14 adapted to be connected to, for example, a drill string 15. A hammer bit generally designated as 18 is slideably retained within the opposite or downstream end 16 of cylindrical housing 12.

A check valve 20 is retained within housing 12 adjacent threaded end 14. Valve body 21 is biased closed by valve spring 22 when the percussion apparatus is not functioning or the apparatus is "tripped" out of the borehole to prevent water or formation detritus from backing up the drill string.

A pneumatic feed tube generally designated as 24, is mounted within a feed tube support member 25; the support member being secured within housing 12. An interior chamber 28 communicates with the drill string 15 at an upstream end of the housing 12 and with slotted, axially aligned openings 26 formed in the feed tube wall at an opposite end of the tube 24. A choke 27 substantially closes off the downstream end of the tube just below the slotted openings 26.

Figure 2:
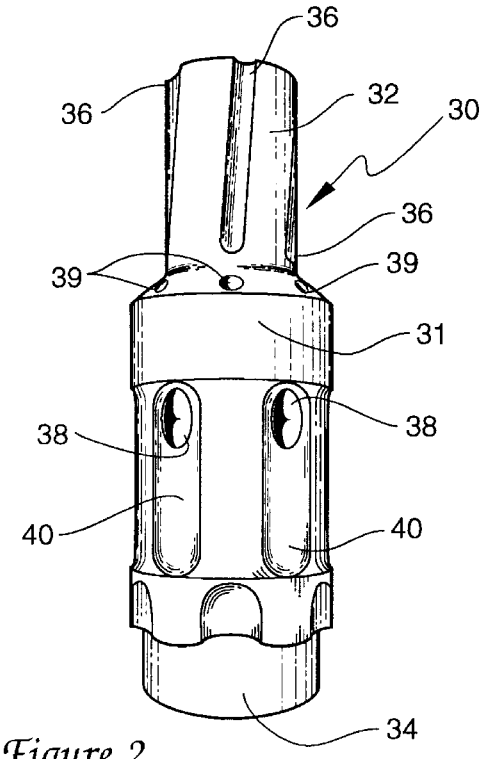
FIG. 2 is a perspective view of the hammer drive piston illustrating the helix grooves formed in the top section of the piston and the various pneumatic ports formed therein.

A pneumatic piston generally designated as 30 slideably engages cylinder wall 13 formed by housing 12. The body 31 of the piston 30 forms an upper, reduced diameter cylindrical segment 32. An inner cylindrical wall 33 overlaps and partially engages the outside wall 29 of the concentric feed tube 24. An annular chamber 35 formed by segment 32 provides a pneumatic conduit for pressurized air to the slots 26 formed in feed tube 24 depending upon the axial position of the piston 30 within housing 12. The piston body 31 further forms ports or conduits 38 and 39 that communicate with slots 26 in tube 24. The ports direct pressurized air either to slots 40 formed in the piston 30 and from there to chamber 41 formed below piston 30 in housing 12 or to annular chamber 37 above the piston depending on the axial position of the piston as the mechanism cycles through its operating modes (see FIGS. 1 and 2).

FIG. 1 illustrates the hammer bit 18 positioned above a borehole bottom 8; the bit being suspended from retaining ring 49 attached to wall 13 near the bottom of housing 12. As long as the bit remains off bottom 8, pressurized air 11 is directed down drillstring 15 into chamber 28 formed in feed tube 24. The air is then directed through slots 26 to annular chamber 35 and from there to chamber 37. Ports 39 in piston 30 then direct the pressurized fluid to air passage 53 formed through the center of hammer bit 18 then out through one or more nozzles 54 formed in the bit cutting face. The air under pressure serves to clean the rock chip debris and other detritus such as accumulated water from the borehole bottom 8 prior to commencement of further drilling operations.

As the air percussion assembly 10 is lowered down the borehole 6 formed in earthen formation 4, the bit 18 contacts bottom 8 (FIG. 3). The bit 18 and piston 30 is subsequently pushed back into housing 12 a distance wherein shoulder 51 formed by the bit 18 contacts rim 16 formed by housing 12. Upon contact, air is shut off to chambers 35 and 37 when the piston moves over the fixed feed tube 24. The pressurized air is then redirected down through ports 38 to slotted channels 40 into chamber 41 below piston 30. The piston is then forcibly accelerated up cylinder walls 13 separating the impact surface 34 formed at the bottom of the piston from the top of the hammer bit 18 as illustrated in FIG. 1. The momentum of the piston mass carries the piston 30 to the upper end of chamber 37. Pressurized air is then redirected to the top of the piston (chamber 37) through slots 26 in feed tube 24 into piston ports 39. The piston then is accelerated down cylinder walls 13; end 34 of the piston subsequently impacting end 55 of the hammer bit 18 thereby completing the cycle (FIG. 8).

FIG. 3 depicts the piston 30 at the top of its travel within cylindrical sleeve 13 prior to being accelerated toward impact surface 55 of hammer bit 18. As the piston moves downward toward the hammer bit, the clutch mechanism generally designated as 56, engages ball 58 with helical groove 36 formed in the upper reduced diameter section 32 of piston 30. The piston moves in a clockwise direction as it moves down toward the hammer bit and, since the hammer bit is keyed to the piston, the bit moves rotationally in concert with the piston. When the piston is cycled in the reverse or upward direction, the clutch slips hence preventing the piston (and hammer bit) from rotating in a counter clockwise direction. The piston and hammer bit therefore is rotationally indexed in a clockwise direction only.

The piston and hammer is preferably rotated on the downstroke of the piston for the following reasons; there is tremendous formation resistance imparted to the piston hammer mechanism on the upward cycle of the piston due to the fact that the lower chamber 41 is charged forcing impact surfaces 34 and 55 apart subsequently driving the current face 19 of the hammer bit into the formation thereby resisting the turning or rotational force exerted on the piston by the ball 58 in helical groove 36. Therefore, if the rotational forces were exerted on the piston and the bit on the downstroke, the bit is released from the formation and the rotational forces easily rotate or index the bit to its new position without unnecessary wear on the various sliding surfaces.

FIG. 4 illustrates a section taken through housing 12 (FIG. 1) showing the piston 30 with the shaft 50 of the hammer 18 slideably retained within sleeve 42 formed by the piston. The rectangular shaped shaft 50 with rounded ends, for example, is slideably retained within complimentarily shaped sleeve 42 formed in piston 30. The central air passage 53 communicates with the nozzles 54 formed in the cutter face 19 of hammer 18.

It would be obvious to utilize conventional hammer bit splines as a means to key the shank of the hammer bit to the piston without departing from the scope of this invention (not shown).

FIG. 5 depicts a section through the hammer body 47 slideably retained in cylindrical sleeve 17 fastened to the lower housing 12. Air passages 52 in the body 47 allow air under pressure to escape around the hammer body when the apparatus 10 is suspended above the borehole bottom 8 (FIG. 1). As heretofore mentioned, a free flow of air prevents debris (and water) from contaminating the air percussion apparatus while the mechanism is being tripped in and out of the borehole.

FIG. 6 details part of the clutch mechanism 56. This view locates the helical groove engaging balls 58 at the bottom of the helix 36 in shank 32 of piston 30 (FIG. 3). The balls 58 are retained in ball race 59; the race 59 being secured within ball and clutch housing 60.

FIG. 7 is a view taken through the clutch mechanism primarily comprised of a multiplicity of "sprags" or clutch dogs 57 that allow rotation in one direction only. Since rotation preferably occurs only on the piston downstroke, the clutch dogs 57 engage the balls within helical tracks 36 resulting in a clockwise rotation of the piston and hammer bit as heretofore described. On the upstroke of the piston the clutch releases the ball driver mechanism. The piston then travels up the housing 12 without rotation.

FIG. 8 illustrates the percussion tool 10 at the completion of an operating cycle. The hammer has been rotated or indexed the preferred 4 to 5 degrees prior to impact of the cutting face 19 of the hammer bit with the formation bottom 8.

Figure 9:
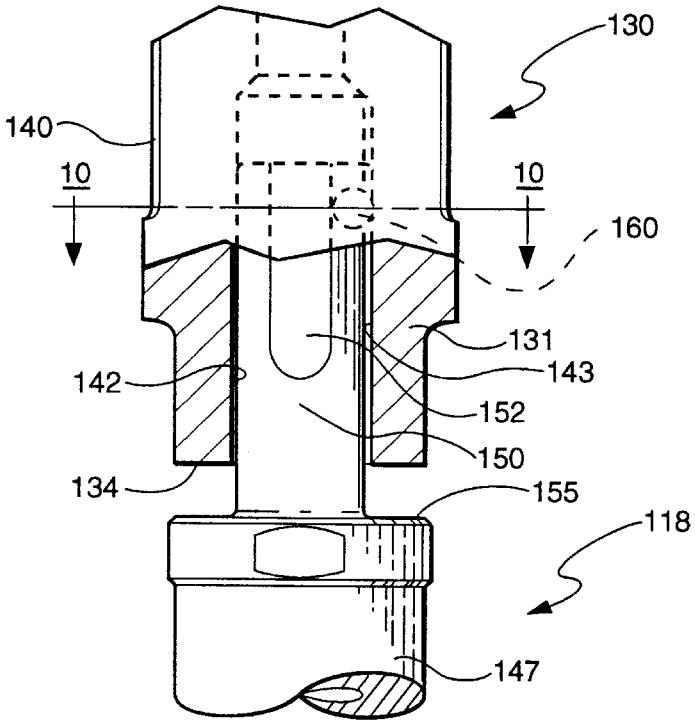
FIG. 9 is a partially cutaway view of an alternative embodiment of the hammer rotary drive means.

FIG. 9 is an alternative piston shank sliding engagement mechanism. The piston 130 forms an internal sleeve 142 with, for example, three parallel, axially aligned semi-circular grooves 120 degrees apart formed in the sleeve wall of the body. The shank 150 of hammer bit 118 retains three ball bearings 160 that are aligned with each of the complimentary grooves 143 formed in the piston body 131. The shank of the hammer bit then is slideably "splined" to the piston with a minimum of drag.

Figure 10:
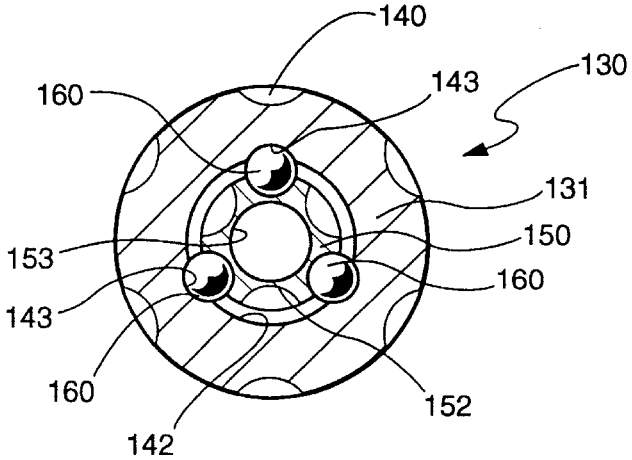
FIG. 10 is a view taken through 10—10 of FIG. 9 illustrating the sliding ball track mechanism between the piston and the hammer bit.

The cross-section of FIG. 10 depicts the ball bearings 160 secured to the shank 150 of the hammer bit 118 and slideably engaged with the parallel grooves 143 formed in the piston body 131.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. An air percussion hammer apparatus with means for rotating a hammer rock drill bit while it reciprocates in a housing independent of an attached drill string, said hammer rock drill bit rotating means comprising:

a cylindrical housing forming a first open up-stream end connectable to a drill string component and a second downstream end, said second end containing said hammer rock drill bit, a pneumatic feed tube forming a first open end and second substantially closed end, said first end of the feed tube is concentric with and fixed within said housing and positioned toward said first up-stream end of said housing, the second end of the feed tube forms one or more metered openings between said first and second ends of the feed tube, a piston body is slidably retained within a first cylindrical sleeve formed by said housing, the piston body forms first and second open ends, said first end is reduced in diameter, said first end further concentrically retains and is slidably engaged with said second end of said feed tube, said second downstream end of said piston body engaged with said housing sleeve forms a hammer striking surface, said piston body further forms at least one axially oriented helical groove in an outside wall formed in said reduced diameter first upstream end of said piston body and at least a pair of pneumatic communication ports between an outside wall of said piston body and an interior chamber formed by said piston body, one of said ports leads from an interior chamber formed by said piston body towards said second open end of said piston body to a chamber formed between the first open end of the piston body and said cylindrical housing, the other of said ports leads from an interior chamber formed between an exterior wall of said piston body and said cylindrical sleeve formed by said housing toward said second open end of said piston body, one or the other of said ports in said piston body sequentially registers with said metered openings in said feed tube when said reciprocating piston body is moved into alignment therewith during an operating cycle of said apparatus, said second end of the piston body further forms a longitudinally extended sleeve concentrically therein, a hammer rock drill bit body slidably contained within a second sleeve formed by said second end of said cylindrical housing, said hammer rock drill bit body further forming an upstream shaft end adapted to be axially slidable within said sleeve formed in said piston body, said shaft end of said hammer rock drill bit body is rotationally keyed to said piston body by an engagement means such that the hammer rock drill bit body moves in concert with said piston body, said hammer drill bit body forming a second downstream cutter end, and clutch means contained within said housing, said clutch means being positioned adjacent to and interconnected with said at least one helical groove formed in said first reduced diameter end of said piston body, the clutch means serves to rotate the piston body and the hammer rock drill bit body engaged therewith incrementally and in one direction only, each time the piston body oscillates within the cylindrical housing during operation of the air percussion apparatus.

2. The invention as set forth in claim 1 wherein said engagement means that slidably keys the upstream shaft end of said hammer rock drill bit body to said sleeve formed by said piston body is at least a pair of longitudinally extending, oppositely opposed flats formed by said upstream shaft end, said piston body forming complimentary flats to slidably accept said upstream shaft end within said sleeve.

3. The invention as set forth in claim 1 wherein said engagement means is at least a pair of spherically shaped detents slidably engaged with complimentary shaped, longitudinally extending grooves formed in adjacent surfaces of said upstream shaft end of said hammer rock drill bit body and said sleeve formed in said piston body.

4. The invention as set forth in claim 3 wherein there are three spherically shaped detents connected to and extending from said upstream end of said shaft of said hammer rock drill bit body, said detents being positioned about 120 degrees apart, said detents being slidably engaged with complimentary shaped longitudinally extending grooves formed by said piston body in a wall of said sleeve.

5. The invention as set forth in claim 1 wherein said engagement means is a multiplicity of longitudinally extending splines formed by said shaft of said hammer rock drill bit body, said splines being slidably interfitted with splines formed by said piston body in a wall of said sleeve.

6. The invention as set forth in claim 1 wherein said piston body and hammer rock drill bit body is rotated by said clutch means on a downstroke of the piston body.

7. The invention as set forth in claim 1 wherein the rotational speed of the piston body and hammer rock drill bit body is between 10 and 20 RPM.

8. The invention as set forth in claim 7 wherein the rotational speed is about 20 RPM.

9. The invention as set forth in claim 1 wherein the hammer rock drill bit body impacts an earthen formation during operation of the air percussion apparatus about 1600 beats per minute.

10. The invention as set forth in claim 9 wherein the rotational speed of the piston body and hammer rock drill bit body results in an angular displacement of the hammer rock drill bit body of about 5 degrees per each impact of the bit against the formation.

11. The invention as set forth in claim 1 wherein the clutch means is a sprag clutch.

12. The invention as set forth in claim 1 wherein the sprag clutch allows the piston body and hammer rock drill bit body to rotate on the downstroke only, the clutch releases on the upward cycle of the piston body.

13. The invention as set forth in claim 11 wherein the clutch is engaged with the helical groove formed in said reduced diameter first upstream end of the piston body by a ball bearing, said helical groove being spherically shaped to match the diameter of the ball bearing.

14. The invention as set forth in claim 12 wherein there are three helical grooves formed in said first upstream end of the piston body 120 degrees apart, each of said grooves is engaged with a ball bearing retained within said clutch means.

15. A method of rotating a hammer rock drill bit of an air percussion hammer bit apparatus while it reciprocates in a housing, the rotating of the bit being independent of an attached drill string comprising the steps of;

forming a cylindrical housing with a first open upstream end connectable to a drill string component and a second downstream end, said second end containing said hammer bit, forming a pneumatic feed tube with a first open end and second substantially closed end, said first end of the feed tube is concentric with and fixed within said housing and positioned toward said first upstream end of said housing, the second end of the feed tube forms one or more metered openings between said first and second ends of the feed tube, forming a piston body that is slidably retained within a first cylindrical sleeve formed by said housing, the piston body forms first and second open ends, said first end is reduced in diameter, said first end further concentrically retains and is slidably engaged with said second end of said feed tube, said second downstream end of said piston body engaged with said housing forms a hammer striking surface, said piston body further forms at least one axially oriented helical groove in an outside wall formed in said reduced diameter first up-stream end of said piston body and at least a pair of pneumatic communication ports between an outside wall of said piston body and an interior chamber formed by said piston body, one of said ports leads from an interior chamber formed by said piston body towards said second open end of said piston body to a chamber formed between the first open end of the piston body and said cylindrical housing, the other of said ports leads from an interior chamber formed between an exterior wall of said piston body and said first cylindrical sleeve formed by said housing toward said second open end of said piston body, one or the other of said ports in said piston body sequentially registers with said metered openings in said feed tube when said reciprocating piston body is moved into alignment therewith during an operating cycle of said apparatus, said second end of the piston body further forms a longitudinally extended sleeve concentrically therein, forming a hammer rock drill bit body that is slidably contained within a second sleeve formed by said second end of said cylindrical housing, said hammer rock drill bit body further forming an upstream shaft end adapted to be axially slidable within said sleeve formed in said piston body, engaging means to slidably engage said shaft end of said hammer rock drill bit body to said piston body such that the hammer rock drill bit body moves in concert with said piston body, said hammer rock bit body forming a second downstream cutter end, and interconnecting a clutch means to said piston body, said clutch means contained within said housing, said clutch means being positioned adjacent to and interconnected with said at least one helical groove formed in said first reduced diameter end of said piston body, the clutch means serves to rotate the piston body and the hammer rock drill bit body engaged therewith incrementally and in one direction only, each time the piston body oscillates within the cylindrical housing during operation of the air percussion apparatus.

16. The method as set forth in claim 15 further comprising the step of rotating the piston body and hammer rock drill bit body on each downstroke of the piston.

[17. An air percussion hammer comprising:

a cylindrical housing having an upstream end having means for connecting to a drill string and a downstream end including means for mounting a hammer bit;

a piston slidably retained within the housing, a downstream end of the piston including a surface for striking a hammer bit mounted on the end of the housing;

fluid porting in the housing for alternately driving the piston upwardly in the housing and driving the piston downwardly in the housing for striking a hammer bit;

means for rotating the piston during the downward stroke of the piston;

means for preventing rotation of the piston during the upward stroke of the piston; and keying means for permitting relative longitudinal movement while preventing relative rotation between the hammer bit and the piston.]

18. [The invention as set forth in claim 17] *An air percussion hammer, comprising:*

*a cylindrical housing having an upstream end having means for connecting to a drill string and a downstream end including means for mounting a hammer bit* [wherein the hammer bit is mounted] for reciprocal movement in the housing*;*

*a piston slidably retained within the housing, a downstream end of the piston including a surface for striking a hammer bit mounted on the end of the housing;*

*fluid porting in the housing for alternately driving the piston upwardly in the housing and driving the piston downwardly in the housing for striking a hammer bit;* [and characterized by]

means for venting fluid from the hammer when the hammer bit is relatively down in the housing and for applying fluid pressure for driving the piston when the hammer bit is relatively up in the housing*;*

*means for rotating the piston during the downward stroke of the piston;*

*means for preventing rotation of the piston during the upward stroke of the piston; and*

*keying means for permitting relatively longitudinal movement while preventing relative rotation between the hammer bit and the piston.*

[19. The invention as set forth in claim 17 wherein the hammer bit is slidably contained within the downstream end of the cylindrical housing, the hammer bit comprising an upstream shaft end axially slidable within the piston, the shaft end of the hammer being rotationally keyed to the piston by an engagement means such that the hammer bit rotates in concert with the piston.]

[20. The invention as set forth in claim 19 wherein the clutch means comprises at least a pair of spherically shaped detents for slidably engaging complementary shaped helical grooves in the upstream end of the piston.]

[21. The invention as set forth in claim 17 wherein the keying means for permitting relative longitudinal movement while preventing relative rotation between the hammer bit and the piston comprises three spherically shaped detents between the upstream end of the shank of the hammer and the inside of the piston, the detents being positioned about 120 degrees apart and slidably engaged with complementary shaped longitudinally extending grooves.]

[22. The invention as set forth in claim 17 wherein the means for rotating the piston during the downward stroke of the piston comprises a helical groove in the piston with a helix angle and length sufficient for rotating the piston approximately five degrees per cycle of the piston.]

[23. The invention as set forth in claim 17 wherein the means for rotating the piston during the downward stroke of the piston comprises a helical groove in the piston and a ball bearing engaging the housing and the helical groove.]

[24. The invention as set forth in claim 23 wherein there are three helical grooves formed in the upstream end of the piston 120 degrees apart, each of the grooves being engaged with a ball bearing retained within the housing.]

25. A method of rotating a hammer rock bit of an air percussion hammer bit apparatus while it reciprocates in a housing, the rotation of the bit being independent of an attached drill string comprising the steps of:

forming a cylindrical housing having an open upstream end connectable to a drill string component and a downstream end containing a hammer bit, the hammer bit being free to reciprocate longitudinally in the housing;

connecting the upstream end of the cylindrical housing to the drill string;

mounting a longitudinally moveable annular piston on the housing defining a first chamber having an upstream end and a downstream end having a hammer striking surface, and including a helical groove in an outside wall of the piston;

alternately passing air from a chamber above the upstream end of the piston to the inside of the piston, and passing air from the inside of the piston to a chamber outside of the piston adjacent to the downstream end of the piston, for reciprocating the piston in the housing and striking the hammer bit;

engaging the helical groove with a detent for rotating the piston during a downward stroke of the piston;

rotating the hammer bit in concert with the piston; and preventing rotation of the piston during an upward stroke of the piston.

* * * * *